June 20, 1939.  C. ZMAY  2,162,793
ROASTING MACHINE
Filed July 26, 1937
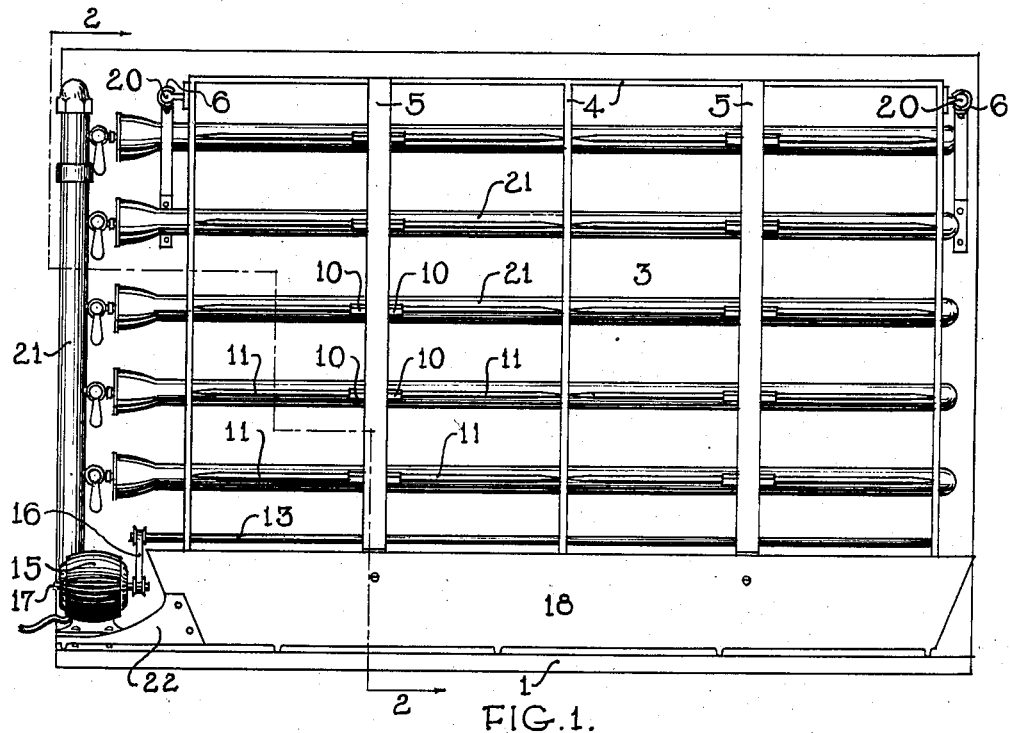
FIG.1.
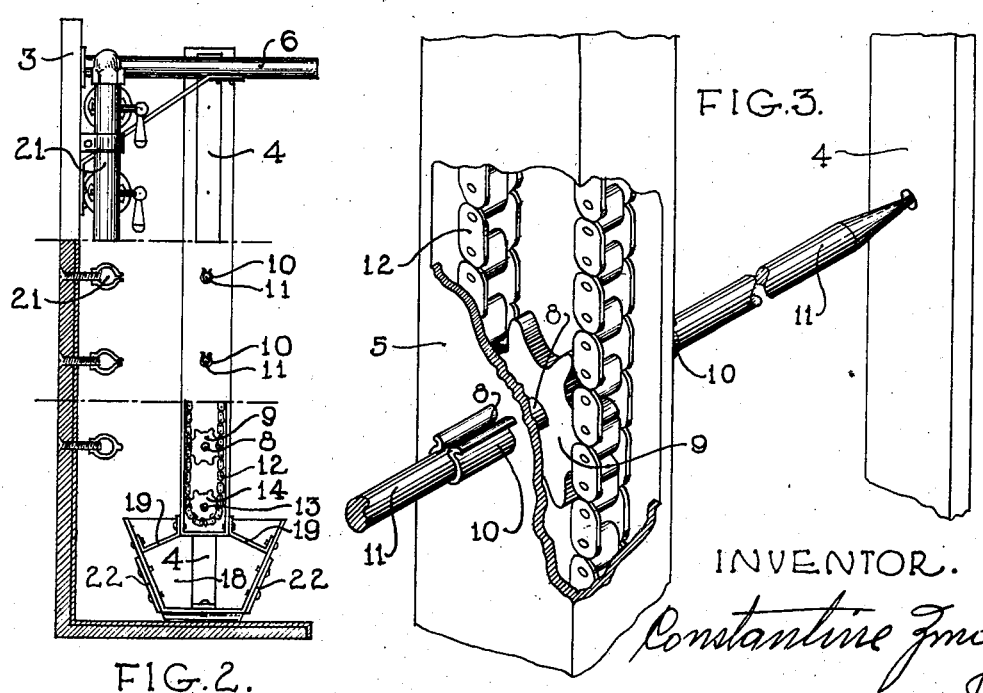
FIG.2.
FIG.3.
INVENTOR.
Constantine Zmay Patented June 20, 1939

2,162,793

UNITED STATES PATENT OFFICE 2,162,793

ROASTING MACHINE

Constantine Zmay, Chicago, Ill.

Application July 26, 1937, Serial No. 155,747

3 Claims. (Cl. 53—5)

The invention relates to a roasting machine which has in itself more than one spindle onto which small pieces of barbecue are placed; and the objects of the machine are, first, to afford facilities for quick roasting by enabling the use of small pieces of meat; second, to provide a method whereby any number of spindles, exceeding one spindle, are held in place and revolved before a fire; third, to provide a supporting frame which will allow the said spindles with the meat on them to be brought closer to the fire or away from the fire depending upon the speed with which they are to be broiled; fourth, to allow the insertion or removal of a spindle independent of the others so that all other spindles may continue to revolve while one spindle is being removed, or another spindle with raw meat on it is being inserted back into proper position for broiling; fifth, to permit the broiled meat to be served directly to the customer with the said spindle; and sixth, to provide a compact and economical roasting machine for use in any store, restaurant, hotel, bar room, etc.

One form of the invention is illustrated in the accompanying drawing, in which Figure 1 is a front view of the entire machine with a gas range in back of it; Figure 2 is a vertical section of the machine on line 2, 2; Figure 3 is an enlarged detail view in isometric of the spindle in its mountings.

The base 1, back wall 3, frame 4, box-shaped containers 5, 5, the guides 6, 6, and the catch box 18 constitute the framework of the machine. In the frame 4 are formed small openings which are placed vertically in relation to each other and at a sufficient distance apart so that when the sharp ends of the spindles are placed within their respective openings and the spindles holding the meat are in proper position, the meat may rotate without conflict. Directly opposite and at the same distance apart as the said openings of frame 4 are to be found other openings in the box-shaped containers 5, 5 which contain shafts such as shaft 8 (Figure 3), with the cog-wheel 9, and two spring clips 10, 10 forming parts thereof. The cog-wheel 9 shall be contained within the box-shaped container 5 midway between the ends of the shaft 8. The outermost diameter of the cog-wheel must be slightly smaller than the inner dimension of the container 5 so as to enable it to turn but not to let the chain 12 slip out of the grasp of the cog-wheel 9. On both ends of the shaft are fastened two spring clips 10, 10 which will aid in holding the spindles 11, 11.

The spindles 11, 11 are easily removed, simply by drawing them sideways from out of the spring clips 10, 10. The small piece of meat to be broiled is then pierced with the said spindle 11, leaving free both ends of the spindle 11 being used. The sharp end of the spindle 11 is then inserted into the opening directly opposite the spring clip 10, and the blunt end of the said spindle 11 into the said spring clip 10. This can all be accomplished while the other spindles are in motion. It is not necessary to stop the motor 15, which turns all the spindles during the process of removing or replacing one of the said spindles. A pulley 16 is connected to the shaft 17, and the shaft 13 which extends in a parallel direction with the spindles through the frame 4 and containers 5, 5 at a sufficient distance from the lowest row of spindles leaving room for the meat that is to revolve on the said lower row of spindles. The shaft 13 has the same number of cog-wheels as there are containers, such as containers 5, 5; and the cog-wheel 14 of the shaft 13 is similar to the cog-wheel 9. In each container there shall be a chain encircling the entire group of cog-wheels as shown in Figure 2.

Acting as a base and support for the motor 15, the catch box 18 forming a part of the frame 4 and reenforcing the containers 5, 5 by means of the reenforcing strips 19, 19, is placed directly below and in alignment with the said spindles for collecting the drippings from the said meat.

The motor 15 which is fastened to an extended part 22 of the catch box 18, the frame 4, the containers 5, 5, the catch box 18, and the spindles with their mountings are movable as a whole by means of the holders 20, 20 in the guides 6, 6 closer to the heating unit or away from the heating unit which consists of the gas range 21 or which may consist of any other stove as those which are operated with charcoal, oil, coal, wood, or electricity.

As many changes in construction and arrangement of parts may be made without departing from the spirit of the invention, as will be apparent to those skilled in the art, reference will be had to the appended claims for a definition of the limits of the invention.

I am aware of the fact that there are inventions patented wherein one spindle or spit is employed, and wherein a heating unit is contained. However I do not claim the aforesaid inventions.

But what I claim is:

1. A spit for roasting machines comprising a rotatable shaft; a spring clip on the end of said shaft; and a meat spindle detachably mounted in said clip.

2. A spit for a roasting machine comprising a plurality of spaced horizontal rotatable shafts mounted one above the other and having both of their ends exposed; spring clips on the exposed ends of said shafts; and meat spindles detachably mounted in said clips.

3. A spit for a roasting machine comprising a frame; a plurality of spaced horizontal rotatable shafts mounted in said frame one above the other with both of their ends exposed; spring clips on each of the ends of said shafts; meat spindles removably mounted in said clips, there being openings in said frame in transverse registration with said shafts for the reception of the points of said meat spindles; and means for simultaneously rotating said shafts.

CONSTANTINE ZMAY.